(12) United States Patent
Denby

(10) Patent No.: US 6,234,216 B1
(45) Date of Patent: May 22, 2001

(54) REFILLING LIQUID STORAGE TANKS

(76) Inventor: Carl Denby, 51 Park Avenue, Normanton, West Yorkshire WF6 2DR (GB)

( * ) Notice: Subject to any disclaimer, the term of this patent is extended or adjusted under 35 U.S.C. 154(b) by 0 days.

(21) Appl. No.: 08/973,338

(22) Filed: Nov. 28, 1997

(51) Int. Cl.[7] .............................. B65B 31/00; B67C 3/00
(52) U.S. Cl. .................................. 141/4; 141/5; 141/44; 141/49; 141/285; 141/372; 137/588; 137/592
(58) Field of Search ......................... 141/2, 4, 5, 18, 141/37, 44, 59, 285, 290, 295, 298, 299, 311 R, 369, 372; 137/583, 587, 588, 589, 590, 592

(56) References Cited

U.S. PATENT DOCUMENTS

| | | | |
|---|---|---|---|
| 1,325,991 | * 12/1919 | King | 141/59 |
| 3,807,465 | 4/1974 | Ginsburgh et al. | 141/285 |
| 4,513,797 | * 4/1985 | Tompkins, Jr. | 141/198 |
| 6,062,274 | * 5/2000 | Pettesch | 141/1 |

* cited by examiner

Primary Examiner—Timothy L. Maust
(74) Attorney, Agent, or Firm—Andrus, Sceales, Starke & Sawall, LLP

(57) ABSTRACT

A pipe with a plurality of gas outlet apertures is inserted inside a fill pipe of a liquid storage tank. The fill pipe has an outlet normally covered by the tank contents. The gas pipe conveys the gaseous contents of the fill pipe to a separate outlet as refilling liquid is introduced into the fill pipe. This allows the gas inside the fill pipe to be separately vented from the fill pipe without disturbing the liquid contents of the tank.

17 Claims, 3 Drawing Sheets

REFILLING LIQUID STORAGE TANKS

Figure 1:
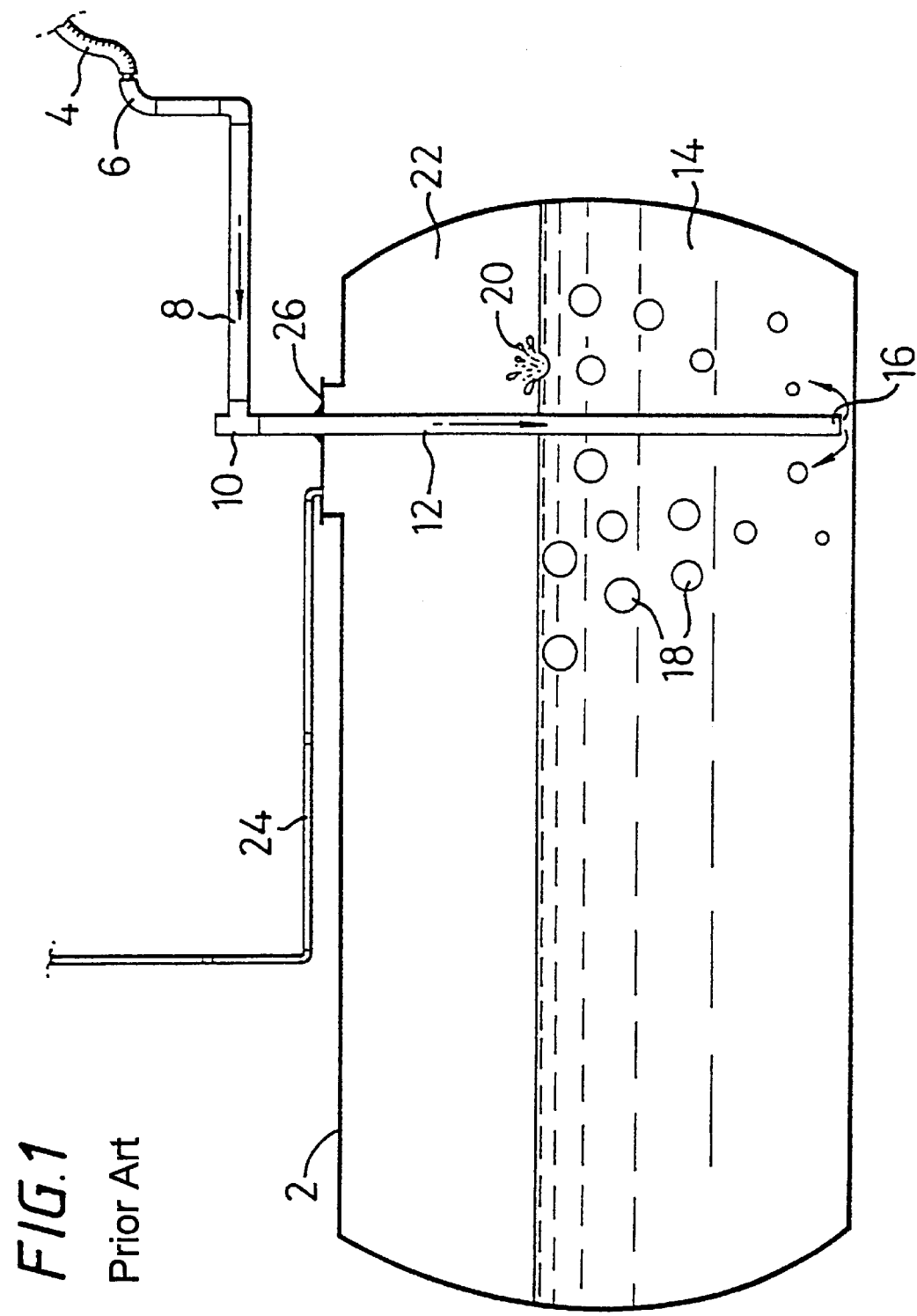

This invention relates to the refilling of liquid storage tanks, in particular but not exclusively to the refilling of storage tanks with petroleum fuels or chemicals.

In the following, the discussion will relate to deliveries made to petrol storage tanks, although it is to be appreciated that the invention can be applied similarly to petroleum, chemical or other storage tanks.

Petrol storage tanks generally have a filling entry at the top of the tank, and have a direct fill point, or a remote (offset) fill point to which a delivery hose of a tanker delivery vehicle is connected for the delivery of liquid product to the tank. A permanent fixture in the form of a drop tube is supported at the filling entry. The liquid outlet of the drop tube is suspended a short distance above the base of the storage tank. This arrangement is intended to reduce disturbance of the incoming product when liquid is delivered into the tank. Rather than falling uncontrolled from the top of the tank on entering, the incoming product mixes directly with the contents remaining in the tank as it exits from the outlet at the end of the drop tube.

European patent application EP-A-0327518 relates to a method for recycling petrol vapors. The drop tube of a petrol storage tank is converted by drilling holes into the side of the drop tube at the top of the petrol tank, so that petrol vapor can enter the drop tube by those apertures. A substitute fill pipe is then inserted into the original drop tube, and the space between the substitute fill pipe and the original drop tube is used to convey vapors entering the original drop tube via the drilled holes from the body of the tank to a vapor recovery unit during filling of the tank. However, the substitute fill pipe functions in precisely the same manner as a conventional internal drop tube, by delivering incoming product directly at a liquid outlet which is immersed in the liquid contents of the tank.

British patent specification number 795,206, published on May 21, 1958, describes an arrangement for drawing seawater from the fuel oil tank of a ship. The seawater is used for ballasting purposes, and forms a non-misicle lower layer seated below an upper layer of fuel oil. When the seawater layer is to be drained, suction is applied to a drainage tube so that the seawater is drawn up through a bell mount. When sufficient seawater has been removed, air is discharged in to the suction pipe by means of an air pipe. When the amount of air entering the drainage tube balances the suction effect, no more seawater is drawn into the drainage tube. As the reader will appreciate, this patent does not describe a liquid storage tank with a filling conduit.

According to one aspect of the invention there is provided a method for refilling a liquid storage tank with a filling conduit having a liquid inlet and a liquid outlet, the liquid outlet being covered by the liquid contents of the tank and the filling conduit having gaseous contents between said liquid inlet and said liquid outlet, the method comprising the steps of removing at least part of the gaseous contents of the filling conduit without ejecting said at least part of the gaseous contents of the filling conduit into the liquid contents of the tank, and delivering liquid to the tank via the filling conduit.

According to a further aspect of the present invention, there is provided a liquid storage tank comprising a filling conduit defining a liquid flow path leading from a liquid inlet to a liquid outlet, said liquid outlet being arranged to be covered by the liquid contents of the tank when the tank is partially filled, and a separate gaseous outlet arranged to remove gaseous contents from said liquid flow path of the filling conduit when said liquid outlet is covered by the liquid contents of the tank and before said gaseous contents are forcibly expelled from the liquid outlet into the liquid contents of the tank.

According to a yet further aspect of the present invention there is provided apparatus for installation in a filling conduit of a liquid storage tank, said filling conduit defining a liquid flow path leading from a liquid inlet to a liquid outlet and said liquid outlet being arranged to be covered by the liquid contents of the tank when the tank is partially filled, said apparatus comprising means for forming a separate gaseous outlet in said filling conduit to remove gaseous contents from said liquid flow path of the filling conduit when said liquid outlet is covered by the liquid contents of the tank and before said gaseous contents are forcibly expelled from the liquid outlet into the liquid contents of the tank.

In the case of a petrol storage tank, the filling conduit, which may include the pipeline connecting the offset fill point (if present) to the top of the drop tube and the drop tube itself, normally contains a vapor/air mixture which is locked in the filling conduit between the inlet and the product inside the internal drop tube. On delivery of liquid into the filling conduit these gaseous contents are, in the conventional arrangement, forced downwards through the drop tube and forcibly expelled from the lower outlet of the drop tube. If, as is normally the case, the lower outlet of the drop tube is immersed in the liquid remaining in the tank, this gaseous mixture enters the remaining liquid.

Such expulsion of the gaseous contents of the drop tube causes turbulence which can cause damage to the tank and the fill pipe itself.

The arrival of the gaseous contents at the liquid surface can also cause an unnecessary amount of vapor emission from the tank during liquid delivery. In its ambient state, if the storage tank contains a volatile liquid product, for example, petrol, a shallow layer of saturated vapor forms above the product surface. The remainder of the tank is filled with unsaturated vapor. However, after a disturbance is caused as described above by the arrival of the gaseous contents at the liquid surface, the saturated vapor layer is destroyed and the remaining space in the tank receives a greater concentration of vapor. During delivery the pressure within the tank is balanced by venting gas from the top of the storage tank. The greater concentration of vapor at the top of the tank leads to a greater amount of emission from the tank during delivery. Increased vapor emissions lead to waste of product and, often more importantly, a environmental hazard insofar as the vapor may be poisonous or otherwise damaging to the environment.

By removing at least part of the gaseous contents of the filling conduit before that part is ejected into the liquid contents of the tank, damage to the tank and vapor emissions from the tank can be reduced.

Figure 2:
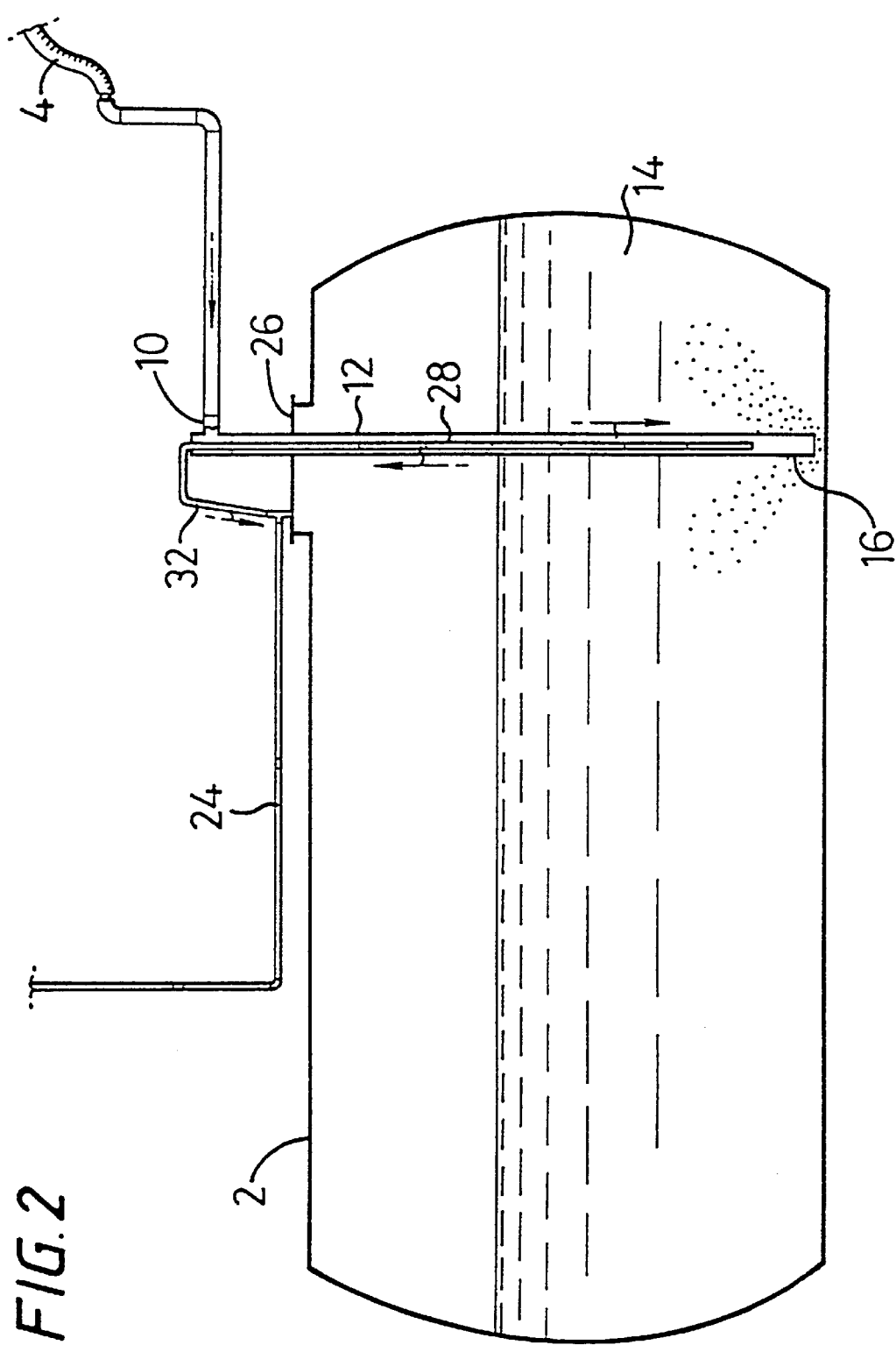
Figure 3:
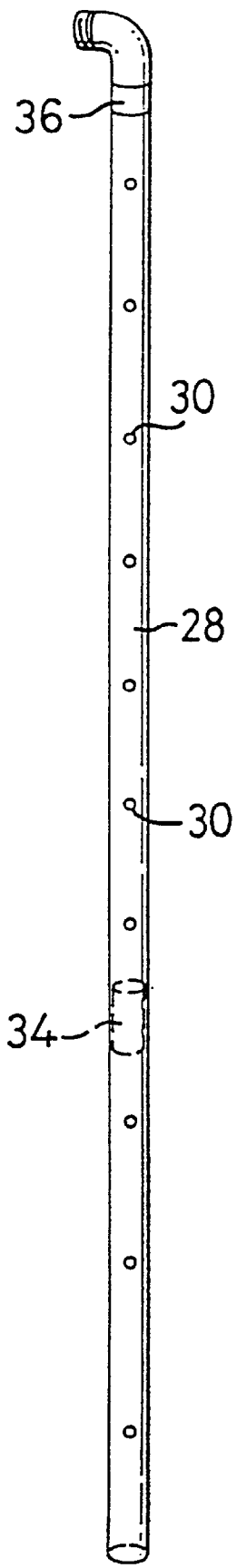

The present invention will now be described, by way of example of only, with reference to the accompanying diagrams, wherein:

FIG. 1 is a schematic cross section of the existing arrangement for liquid storage tank refilling;

is FIG. 2 shows a view similar to FIG. 1 of an arrangement according to the present invention; and FIG. 3 shows a side view of a pipe for use in realising the present invention.

FIG. 1 illustrates the events occurring shortly after the start of a conventional method of delivery of liquid, such as petrol, from a tanker vehicle (not shown) to a storage tank 2, which may be underground. As is known, the liquid travels down tanker hose 4, into offset fill point 6, through connecting pipelines 8, junction piece 10 and down internal drop tube 12 which is fixed to a manhole cover 26. Inevitably, the gas which is trapped in the filling conduit between the tanker to the outlet of the drop tube 12 is pushed downwards into the liquid 14 remaining in the tank 2 immediately prior to the delivery. When the gas, under considerable head pressure, exits the lower end 16 of drop tube 12, gas bubbles 18 are dispersed into the liquid, expanding as they rise due to the reduction of pressure with overhead liquid height. When bubbles 18 reach the surface, they burst as shown at disturbance 20 causing not only the dispersal of additional vapor into the ullage space 22, but also causing the dispersal of the saturated vapor layer lying immediately above the liquid surface throughout the ullage space 22. Eventually, all the air/vapor previously contained within the filling conduit 6,8,10,12 is Ejected, and the delivered liquid meets the stored liquid directly as it exits from the drop tube outlet 16. As filling continues, pressure builds within ullage space 22 and air/vapor is vented through tank vent tank 24 to reduce the pressure within the tank 2. Sometime after the delivery, the vapor in ullage space 22 settles such that the gradient in concentration of vapor increasing towards the liquid surface re-establishes. As will be appreciated, if instead the concentration gradient were ambiently maintained throughout a delivery, the air/vapor mixture vented during the delivery would contain less vapor.

Reference is now made to the present invention illustrated in FIG. 2. Since the present invention is realizable by suitable conversion of the equipment shown in FIG. 1, the same components of the equipment shown in FIG. 1 are referred to by the same numerals. A primary component of this embodiment of the invention is an internal pipe 28, having regularly spaced apertures 30 along its length, as shown in FIG. 3. A connecter pipe 32 connects internal ripe 28, adjacent junction piece 10 at the top of drop tube 12, to the vent stack 24, adjacent the manhole cover 26 via connector pipe 32. The internal pipe 28 extends downwards into drop tube 12, and has a length approximately equal to that of drop tube 12, so that it can receive gases from most parts of the drop tube 12.

During delivery of liquid to the tank 2, as the liquid enters the filling conduit, the pressure within drop tube 12 increases, and locked gaseous mixture is forced into the apertures 30 of the internal pipe 28. Once inside internal pipe 28, the vapor/air mixture moves up she pipe, into vent stack 24 and is eventually vented without entering, or coming into contact with, the liquid 14 within the tank 2. This removal of the gas within the filling conduit 6,8,10,12 continues as the incoming liquid travels down the conduit. Eventually, the incoming liquid meets the stored liquid after substantially all of the gas is remover from the filling conduit 6,8,10,12. Once this is the case, the weight of incoming liquid acts against the stored liquid and the incoming liquid, substantially free of vapor and/or air, leaves the lower outlet 16 of the drop tube 12 without causing excessive disturbance.

With reference to FIG. 3, for preventing the removal of product via the internal pipe 28, a float valve 34 is located within the pipe, which travels upwards and downwards according to the height of liquid within. A gas separator valve 36 may also be provided at the top of internal pipe 28 which prevents the ingress of liquid into connector pipe 32. As will be appreciated, the internal pipe 28 has gas outlets spaced along its length, and thus performs its function irrespective of the existing liquid level within tank 2 when a delivery begins.

Tank vent 24 may be provided with a valve which maintains pressure within the tank during delivery at slightly above atmospheric pressure, such a valve having a vapor conserving effect insofar as an amount of vapor is not unnecessarily vented at delivery.

It is to be mentioned that alternative modes of embodying the present invention can readily be employed.

In one alternative embodiment the junction piece 10 may simply be provided with a gas separator valve which allows the outlet of gas during the initial stages of delivery. Such a valve may be associated with flow directing means such as a guard plate which guides the incoming product away from the air separator valve.

In another alternative embodiment, the internal drop tube itself may be provided with one or more gas outlets along its length, to allow at least some of its gaseous contents to be expelled directly into the head space of the tank without being ejected from the immersed liquid outlet of the drop tube.

Various other modifications or variations might be employed by a skilled person without exceeding the scope or spirit of the present invention.

What is claimed is:

1. A method for refilling a liquid storage tank with a filling conduit defining a liquid flow path leading from a liquid inlet and a liquid outlet, the liquid outlet being covered by the liquid contents of the tank and the filling conduit having gaseous contents in the liquid flow path, the method comprising the steps of removing at least part of the gaseous contents of the filling conduit without ejecting said at least part of the gaseous contents of the filling conduit into the liquid contents of the tank, and delivering liquid to the tank via liquid flow path of the filling conduit.

2. A method according to claim 1, wherein said at least part of the gaseous contents are removed via a separate outlet formed in said filling conduit between said liquid inlet and said liquid outlet.

3. A method according to claim 1, wherein said at least part of the gaseous contents from the filling conduit are removed as the liquid being delivered moves through the filling conduit.

4. A method according to claim 3, wherein the removing step is performed by venting said at least part of the gaseous contents from the filling conduit.

5. A method according to claim 2, wherein said at least part of the gaseous contents are removed through a gaseous conduit located inside said filling conduit to receive gaseous contents from said filling conduit through one or more gaseous outlets spaced from said liquid outlet.

6. A method according to claim 1, wherein the majority of the gaseous contents of the filling conduit are removed without ejection into the liquid contents of the tank.

7. A liquid storage tank comprising a filling conduit defining a liquid flow path leading from a liquid inlet to a liquid outlet, said liquid outlet being arranged to be covered by the liquid contents of the tank when the tank is partially filled, and a separate gaseous outlet arranged to remove gaseous contents from said liquid flow path of the filling conduit when said liquid outlet is covered by the liquid contents of the tank and before said gaseous contents are forcibly expelled from the liquid outlet into the liquid contents of the tank.

8. A liquid storage tank according to claim 7, wherein said gaseous outlet is located in said liquid flow path, spaced from both said liquid inlet and said liquid outlet.

9. A liquid storage tank according to claim 7 or 8, wherein the liquid storage tank comprises a gaseous conduit located inside said filling conduit, said gaseous outlet being provided on said gaseous conduit.

10. A liquid storage tank according to claim 9, wherein said gaseous conduit has a plurality of said gaseous outlets spaced along its length.

11. A liquid storage tank according to claim 7, wherein said tank has a gas vent and said gaseous outlet is fluidly connected to said gas vent.

12. A liquid storage tank according to claim 7, wherein said filling conduit comprises an internal drop tube, said gaseous outlet being located within said internal drop tube.

13. A liquid storage tank according to claim 7, wherein said liquid storage tank is a fuel storage tank.

14. Apparatus for installation in a filling conduit of a liquid storage tank, said filling conduit defining a liquid flow path leading from a liquid inlet to a liquid outlet and said liquid outlet being arranged to be covered by the liquid contents of the tank when the tank is partially filled, said apparatus comprising means for forming a separate gaseous outlet in said filling conduit to remove gaseous contents from said liquid flow path of the filling conduit when said liquid outlet is covered by the liquid contents of the tank and before said gaseous contents are forcibly expelled from the liquid outlet into the liquid contents of the tank.

15. Apparatus according to claim 14, wherein said gaseous outlet forming means is a gaseous conduit for location inside said filling conduit.

16. Apparatus according to claim 15, wherein said gaseous conduit has a plurality of gas outlets spaced along its length to convey gas into the gaseous conduit.

17. Apparatus according to claim 14, further comprising a connector conduit for fluidly connecting said separate gaseous outlet to a gas vent of the liquid storage tank.

* * * * *